United States Patent
Sivasankar et al.

(10) Patent No.: US 9,929,937 B2
(45) Date of Patent: Mar. 27, 2018

(54) LAYER 3 ROUTING LOOP PREVENTION SYSTEM

(71) Applicant: Dell Products L.P., Round Rock, TX (US)

(72) Inventors: Ravikumar Sivasankar, San Jose, CA (US); Ramasubramani Mahadevan, Tamilnadu (IN); Karthik Krishnamurthy, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 14/838,008

(22) Filed: Aug. 27, 2015

(65) Prior Publication Data

US 2017/0063668 A1    Mar. 2, 2017

(51) Int. Cl.
| | |
|---|---|
| *H04L 12/713* | (2013.01) |
| *H04L 12/46* | (2006.01) |
| *H04L 12/28* | (2006.01) |
| *H04L 12/705* | (2013.01) |
| *H04L 12/709* | (2013.01) |

(52) U.S. Cl.
CPC .......... *H04L 45/18* (2013.01); *H04L 12/2865* (2013.01); *H04L 12/462* (2013.01); *H04L 45/245* (2013.01); *H04L 45/586* (2013.01); *H04L 2012/4629* (2013.01)

(58) Field of Classification Search
CPC ..... H04L 12/437; H04L 12/46; H04L 12/462; H04L 45/00; H04L 45/18; H04L 45/245; H04L 45/50; H04L 45/586; H04L 12/2865; H04L 41/0654; H04L 45/22; H04L 45/28; H04L 45/74; H04L 2012/4629

See application file for complete search history.

(56) References Cited

U.S. PATENT DOCUMENTS

| | | | | |
|---|---|---|---|---|
| 6,751,191 B1 * | 6/2004 | Kanekar | ............. | H04L 12/4641 370/217 |
| 7,006,431 B1 * | 2/2006 | Kanekar | ............. | H04L 12/4641 370/217 |
| 7,027,406 B1 * | 4/2006 | Shabtay | ............. | H04L 12/4625 370/249 |
| 7,167,443 B1 * | 1/2007 | Dantu | ................... | H04L 12/437 370/218 |

(Continued)

FOREIGN PATENT DOCUMENTS

CN        102244609 A  * 11/2011  .......... H04L 45/583

*Primary Examiner* — Eric Nowlin
(74) *Attorney, Agent, or Firm* — Haynes and Boone, LLP (57) ABSTRACT

A layer 3 routing loop prevention system includes a port extender coupled to a first and second control bridges by a Link Aggregation Group (LAG). The first and second control bridges are coupled by an interchassis link. When the first control bridge receives a packet and determines that its LAG link to the port extender is unavailable, it provides a control bridge failover identifier in the packet and performs layer 3 forwarding to send the packet to the second control bridge over the interchassis link. When the second control bridge receives the packet though the interchassis link and determines that its LAG link to the port extender is unavailable, that the packet includes the first control bridge failover identifier, and that layer 3 forwarding will result in the packet being sent back to the first control bridge device, the packet is dropped to prevent layer 3 routing loops.

20 Claims, 9 Drawing Sheets

(56) References Cited

U.S. PATENT DOCUMENTS

| | | | |
|---|---|---|---|
| 7,362,700 B2* | 4/2008 | Frick | H04L 41/0663 370/219 |
| 7,477,593 B2* | 1/2009 | Scudder | H04L 45/02 370/217 |
| 7,478,154 B2* | 1/2009 | Cochran | H04L 41/0893 370/229 |
| 7,483,370 B1* | 1/2009 | Dayal | G06F 11/2038 370/219 |
| 7,551,551 B2* | 6/2009 | Filsfils | H04L 45/02 370/219 |
| 7,561,571 B1* | 7/2009 | Lovett | H04L 12/66 370/392 |
| 7,664,110 B1* | 2/2010 | Lovett | H04L 49/351 370/392 |
| 7,668,081 B2* | 2/2010 | Hermsmeyer | H04L 45/00 370/218 |
| 7,672,227 B2* | 3/2010 | Santoso | H04L 43/0817 370/217 |
| 7,680,031 B1* | 3/2010 | Luft | H04L 12/437 370/222 |
| 7,685,281 B1* | 3/2010 | Saraiya | G06F 13/387 370/392 |
| 7,873,693 B1* | 1/2011 | Mehrotra | H04L 12/4641 370/401 |
| 7,921,224 B2* | 4/2011 | Jajoo | G06F 11/202 709/224 |
| 7,953,903 B1* | 5/2011 | Finkelstein | H04L 12/4641 710/104 |
| 7,961,626 B2* | 6/2011 | Reeve | H04L 45/00 370/235 |
| 7,971,094 B1* | 6/2011 | Benn | G06F 11/2025 714/11 |
| 7,979,552 B1* | 7/2011 | Saraiya | G06F 13/387 370/392 |
| 8,077,604 B1* | 12/2011 | Kanekar | H04L 12/4641 370/219 |
| 8,145,785 B1* | 3/2012 | Finkelstein | H04L 49/357 370/401 |
| 8,301,749 B1* | 10/2012 | Finklestein | H04L 49/357 709/201 |
| 8,320,282 B2* | 11/2012 | Rollins | H04L 12/423 370/258 |
| 8,443,066 B1* | 5/2013 | Saraiya | G06F 13/387 370/392 |
| 8,467,316 B1* | 6/2013 | Goli | H04L 12/4625 370/254 |
| 8,601,053 B2* | 12/2013 | Mehrotra | H04L 12/4641 370/401 |
| 8,713,295 B2* | 4/2014 | Bax | G06F 9/4405 713/1 |
| 8,743,872 B2* | 6/2014 | Chidambaram | H04L 47/6205 370/386 |
| 8,750,122 B1* | 6/2014 | Assarpour | H04L 12/462 370/235 |
| 8,761,005 B2* | 6/2014 | Subramanian | H04L 45/245 370/225 |
| 8,943,221 B2* | 1/2015 | McNamee | H04L 45/42 709/217 |
| 9,025,434 B2* | 5/2015 | Maltz | H04L 41/0883 370/216 |
| 9,059,902 B2* | 6/2015 | Singal | H04L 45/28 |
| 9,077,650 B2* | 7/2015 | Budhia | H04L 49/253 |
| 9,118,589 B2* | 8/2015 | Natarajan | H04L 45/28 |
| 9,167,501 B2* | 10/2015 | Kempf | H04L 12/4633 |
| 9,231,821 B2* | 1/2016 | Arumugam | H04L 41/0654 |
| 9,276,834 B2* | 3/2016 | Kanekar | H04L 12/4641 |
| 9,306,891 B2* | 4/2016 | McNamee | H04L 45/42 |
| 9,356,799 B2* | 5/2016 | Davari | H04L 12/437 |
| 9,374,298 B2* | 6/2016 | Tsai | H04L 45/245 |
| 9,401,865 B2* | 7/2016 | Morimoto | H04L 12/4641 |
| 9,439,129 B2* | 9/2016 | McNamee | H04L 45/42 |
| 9,479,720 B1* | 10/2016 | Hegar | H04N 21/4302 |
| 9,497,123 B2* | 11/2016 | Basavaraja | H04L 45/745 |
| 2004/0001485 A1* | 1/2004 | Frick | H04L 41/0663 370/389 |
| 2004/0114595 A1* | 6/2004 | Doukai | H04L 45/00 370/389 |
| 2005/0222815 A1* | 10/2005 | Tolly | H04L 43/50 702/185 |
| 2006/0221813 A1* | 10/2006 | Scudder | H04L 45/02 370/216 |
| 2007/0070909 A1* | 3/2007 | Reeve | H04L 45/00 370/238 |
| 2007/0280111 A1* | 12/2007 | Lund | H04L 47/10 370/235 |
| 2008/0095047 A1* | 4/2008 | Skalecki | H04L 41/0668 370/225 |
| 2008/0112312 A1* | 5/2008 | Hermsmeyer | H04L 45/00 370/228 |
| 2008/0162981 A1* | 7/2008 | Jajoo | G06F 11/202 714/2 |
| 2008/0259951 A1* | 10/2008 | Cardona | H04L 41/0668 370/465 |
| 2009/0161567 A1* | 6/2009 | Jayawardena | H04L 43/0847 370/252 |
| 2009/0274155 A1* | 11/2009 | Nakash | H04L 12/462 370/395.53 |
| 2010/0165883 A1* | 7/2010 | Holness | H04L 45/28 370/255 |
| 2011/0128970 A1* | 6/2011 | Breton | H04L 12/2852 370/463 |
| 2012/0076048 A1* | 3/2012 | Kanekar | H04L 12/4641 370/254 |
| 2012/0158993 A1* | 6/2012 | McNamee | H04L 45/42 709/238 |
| 2012/0243442 A1* | 9/2012 | Musku | H04L 12/4625 370/256 |
| 2012/0275297 A1* | 11/2012 | Subramanian | H04L 45/245 370/225 |
| 2013/0111095 A1* | 5/2013 | Mehrotra | H04L 12/4641 710/301 |
| 2013/0117426 A1* | 5/2013 | Saraiya | G06F 13/387 709/222 |
| 2013/0117766 A1* | 5/2013 | Bax | G06F 9/4405 719/323 |
| 2013/0151646 A1* | 6/2013 | Chidambaram | H04L 47/6205 709/213 |
| 2013/0301427 A1* | 11/2013 | Tsai | H04L 45/245 370/252 |
| 2013/0322436 A1* | 12/2013 | Wijnands | H04L 45/20 370/389 |
| 2013/0322444 A1* | 12/2013 | Ossipov | H04L 45/18 370/392 |
| 2013/0322457 A1* | 12/2013 | Budhia | H04L 49/253 370/401 |
| 2014/0056122 A1* | 2/2014 | Singal | H04L 41/0668 370/220 |
| 2014/0078882 A1* | 3/2014 | Maltz | H04L 41/0883 370/216 |
| 2014/0204731 A1* | 7/2014 | Ye | H04L 45/22 370/222 |
| 2014/0241247 A1* | 8/2014 | Kempf | H04L 12/4633 370/328 |
| 2014/0254352 A1* | 9/2014 | Natarajan | H04L 45/245 370/228 |
| 2015/0029837 A1* | 1/2015 | Ashwood-Smith | H04L 45/34 370/228 |
| 2015/0055656 A1* | 2/2015 | Morimoto | H04L 12/4641 370/392 |
| 2015/0100640 A1* | 4/2015 | McNamee | H04L 45/42 709/204 |
| 2015/0138951 A1* | 5/2015 | Arumugam | H04L 41/0654 370/225 |
| 2015/0172222 A1* | 6/2015 | Liao | H04L 49/356 370/392 |
| 2015/0271105 A1* | 9/2015 | Budhia | H04L 49/253 370/392 |

(56) References Cited

U.S. PATENT DOCUMENTS

| | | | |
|---|---|---|---|
| 2016/0020940 A1* | 1/2016 | Maltz | H04L 41/0883 |
| | | | 370/216 |
| 2016/0149800 A1* | 5/2016 | Li | H04L 45/18 |
| | | | 370/392 |
| 2016/0174129 A1* | 6/2016 | McNamee | H04L 45/42 |
| | | | 370/328 |
| 2016/0182378 A1* | 6/2016 | Basavaraja | H04L 45/745 |
| | | | 370/235 |
| 2016/0191304 A1* | 6/2016 | Muller | H04L 41/0668 |
| | | | 370/220 |
| 2017/0026294 A1* | 1/2017 | Basavaraja | H04L 45/745 |
| 2017/0041555 A1* | 2/2017 | Hegar | H04N 21/4302 |
| 2017/0078380 A1* | 3/2017 | Aggarwal | H04L 67/02 |
| 2017/0257309 A1* | 9/2017 | Appanna | H04L 45/245 |
| 2017/0289040 A1* | 10/2017 | Sreeramoju | H04L 47/12 |

\* cited by examiner

LAYER 3 ROUTING LOOP PREVENTION SYSTEM

BACKGROUND

The present disclosure relates generally to information handling systems, and more particularly to a layer 3 routing loop prevention system for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switches or routers, are utilized in directing data traffic through networks. In some situations, multiple devices may be used to provide a logical switch that is used to direct data traffic. For example, a plurality of control bridge devices may be coupled to a plurality of port extender devices to provide a logical switch such as, for example, per the Institute of Electrical and Electronics Engineers (IEEE) 802.1BR standard. In some scenarios, links between the control bridge devices and/or port extender devices may be aggregated. In such aggregated link situations, the failure of one or more aggregated links can create issues that result in layer 3 routing loops. For example, a port extender device may be coupled to two control bridge devices via a first Link Aggregation Group (LAG) that includes a first link to a first control bridge device and a second link to the second control bridge device, and the first and second control bridge devices may be coupled together via a second LAG (sometimes referred to as an Inter-Chassis Link (ICL)). When the first link in first LAG to the first control bridge device fails, the first control bridge device may failover to a backup path that results in the first control bridge device forwarding traffic destined for the port extender device over the second LAG to the second control bridge device, and the second control bridge device forwarding that traffic to the port extender device over the second link. Similarly, when the second link in first LAG to the second control bridge device fails, the second control bridge device may failover to a backup path that results in the second control bridge device forwarding traffic destined for the port extender device over the second LAG to the first control bridge device, and the first control bridge device forwarding that traffic to the port extender device over the first link.

However, if both the first link and the second link in the first LAG fail or are otherwise unavailable at the same time, such failover behavior may be enabled in both the first control bridge device and the second control bridge device. As such, the first control bridge device may failover to the backup path that results in the first control bridge device forwarding traffic destined for the port extender device over the second LAG to the second control bridge device, the second control bridge device may failover to the backup path that results in the second control bridge device forwarding that traffic back over the second LAG to the first control bridge device, and so on until the time to live (TTL) of the traffic reaches zero. During the time until the TTL reaches zero, the traffic will loop between the first control bridge device and the second control bridge device, using bandwidth of the second LAG and reducing the bandwidth of the logical switch.

Accordingly, it would be desirable to provide a layer 3 routing loop prevention system.

SUMMARY

According to one embodiment, an information handling system (IHS) includes at least one first port that is coupled to at least one first link in a first link aggregation group (LAG) provided on an extender device; a second port that provides a second link to a control bridge device; a processing system that is coupled to the at least one first port and the second port; a memory system that includes instructions that, when executed by the processing system, cause the processing system to provide a packet processing engine that is configured to: receive a first packet through the second link from the control bridge device, wherein the first packet is directed to the extender device; determine that the at least one first link is unavailable for forwarding the first packet to the extender device; determine that the first packet includes a control bridge device failover identifier; determine that the performance of layer 3 forwarding will result in the first packet being sent to the control bridge device; and drop the first packet in response to determining that the first packet was received through the at least one second link, includes the control bridge device failover identifier, and will be sent to the control bridge device if layer 3 forwarding is performed.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
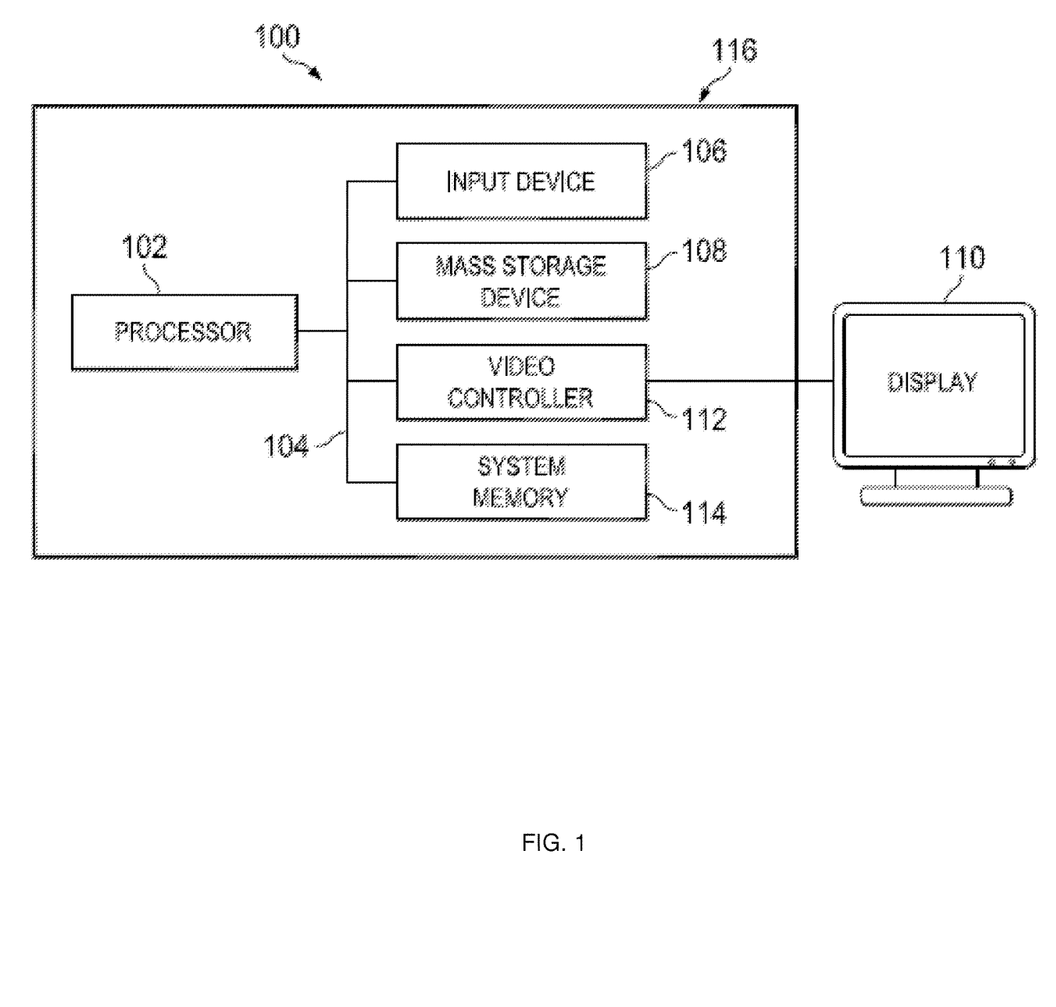
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
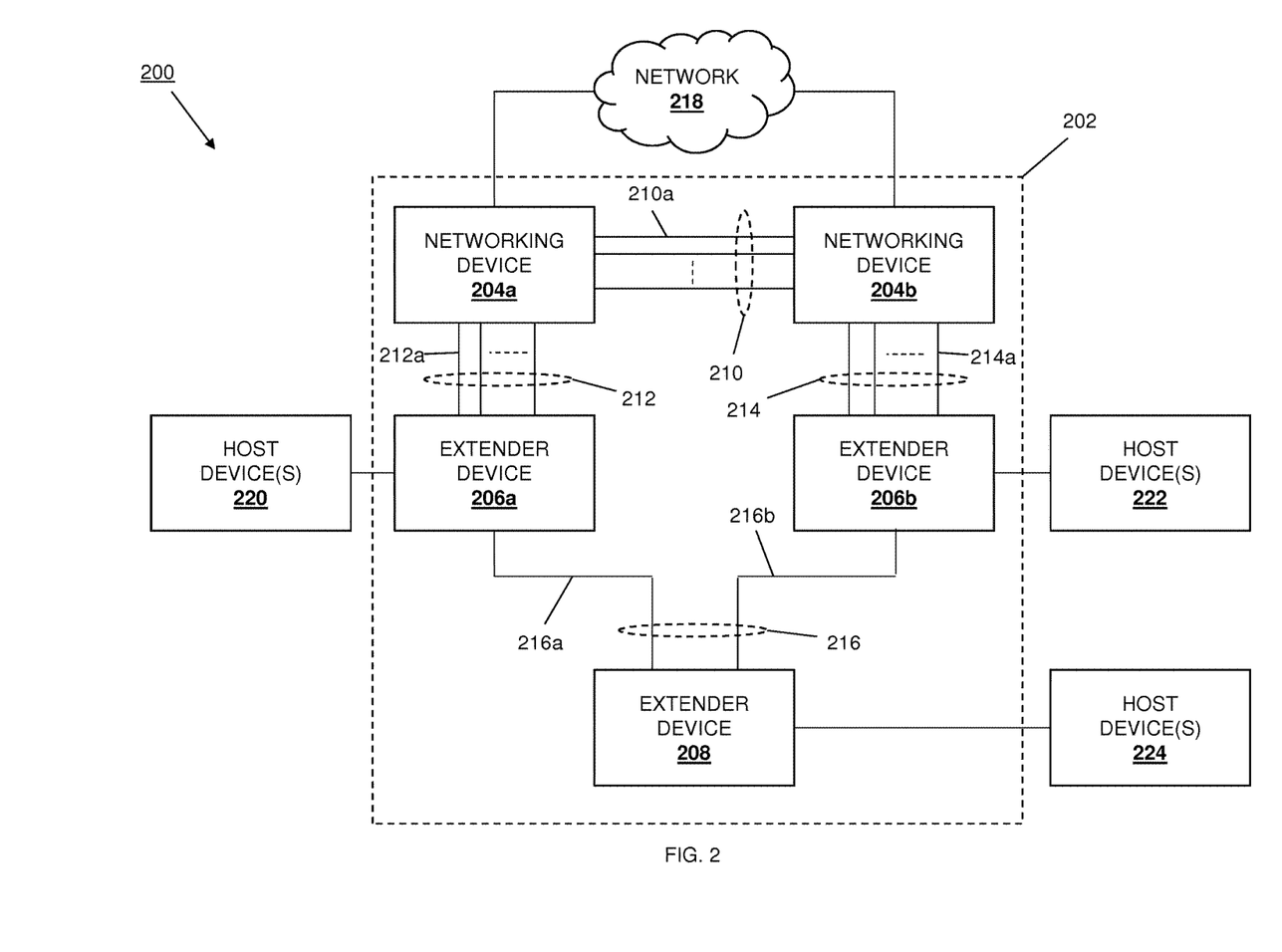
FIG. 2 is a schematic view illustrating an embodiment of a layer 3 routing loop prevention system.

Referring now to FIG. 2, an embodiment of a layer 3 routing loop prevention system 200 is illustrated. In the illustrated embodiment, the layer 3 routing loop prevention system 200 includes a logical switch 202 that is provided by a pair of networking devices 204a and 204b connected to a pair of extender devices 206a and 206b, respectively, that are further connected to an extender device 208 in order to couple the networking devices 204a and 204b to the extender device 208. The networking devices 204a and 206b are coupled together by a first link aggregation group (LAG) 210 that includes a plurality of first LAG links 210a. Furthermore, the networking device 204a is coupled to the extender device 206a by a second LAG 212 that includes a plurality of second LAG links 212a, and the networking device 204b is coupled to the extender device 206b by a third LAG 212 that includes a plurality of third LAG links 214a. The extender devices 206a and 206b are coupled to the extender device 208 by a fourth LAG 216 that includes a plurality of fourth LAG links 216a and 216b. As is known in the art, any of the LAGs 210, 212, 214, and 216 may be provided by combining multiple network connections (e.g., links provided between ports on the devices) in parallel in order to increase throughput and/or provide redundancy. Such aggregation may be accomplished via link aggregation control protocol such as those defined in IEEE 802.1AX and IEEE 802.1aq, as well by proprietary solutions such as Virtual Trunk Linking (VLT) and/or other aggregation solutions known in the art. For example, in some of the embodiments discussed below, the fourth LAG 216 is described as provided by VLT.

Either or both of the networking devices 206a and 206b may be the IHS 100 discussed above with reference to FIG. 1 and/or may include some or all of the components of the IHS 100. In some of the embodiments discussed below, the networking devices 204a and 204b are described as first and second control bridge devices, but in other embodiments may include any of a variety of different networking devices known in the art. Any of the extender devices 206a, 206b, and 208 may be the IHS 100 discussed above with reference to FIG. 1 and/or may include some or all of the components of the IHS 100. In some of the embodiments discussed below, the extender devices 206a, 206b, and 208 are described as port extender devices, but in other embodiments may include any of a variety of different extender devices known in the art. Furthermore, a physical or logical switch may be provided by wide variety of devices that will benefit from the teachings of the present disclosure similarly as described below for the logical switch, and those devices are envisioned as falling within the scope of the present disclosure as well. Thus, while a specific configuration of the networking devices 204a and 204b and the extender devices 206a, 206b, and 208 are illustrated, one of skill in the art in possession of the present disclosure will recognize that the networking devices, extender devices, and other devices (e.g., other than networking/control bridge devices and extender/port extender devices) may be coupled together in different manners to perform the functions discussed below while remaining within the scope of the present disclosure.

Each of the networking devices 204a and 204b are illustrated as coupled to a network 218. As discussed below, either or both of the networking devices 206a and 206b may receive data traffic packets through the network 218 from source devices that may be the IHS 100 discussed above with reference to FIG. 1. Each of the extender devices 206a, 206b, and/or 208 may be coupled to one or more host devices. In the illustrated embodiment, the extender device 206a is coupled to host device(s) 220, the extender device 206b is coupled to host device(s) 222, and the extender device 208 is coupled to host device(s) 224. Any or all of the host devices 220, 222, and 224 may be the may be the IHS 100 discussed above with reference to FIG. 1, and in specific examples may provide a destination device that is the destination of a data traffic packet received by either of the networking devices 204a and/or 204b as discussed in further detail below.

Figure 3:
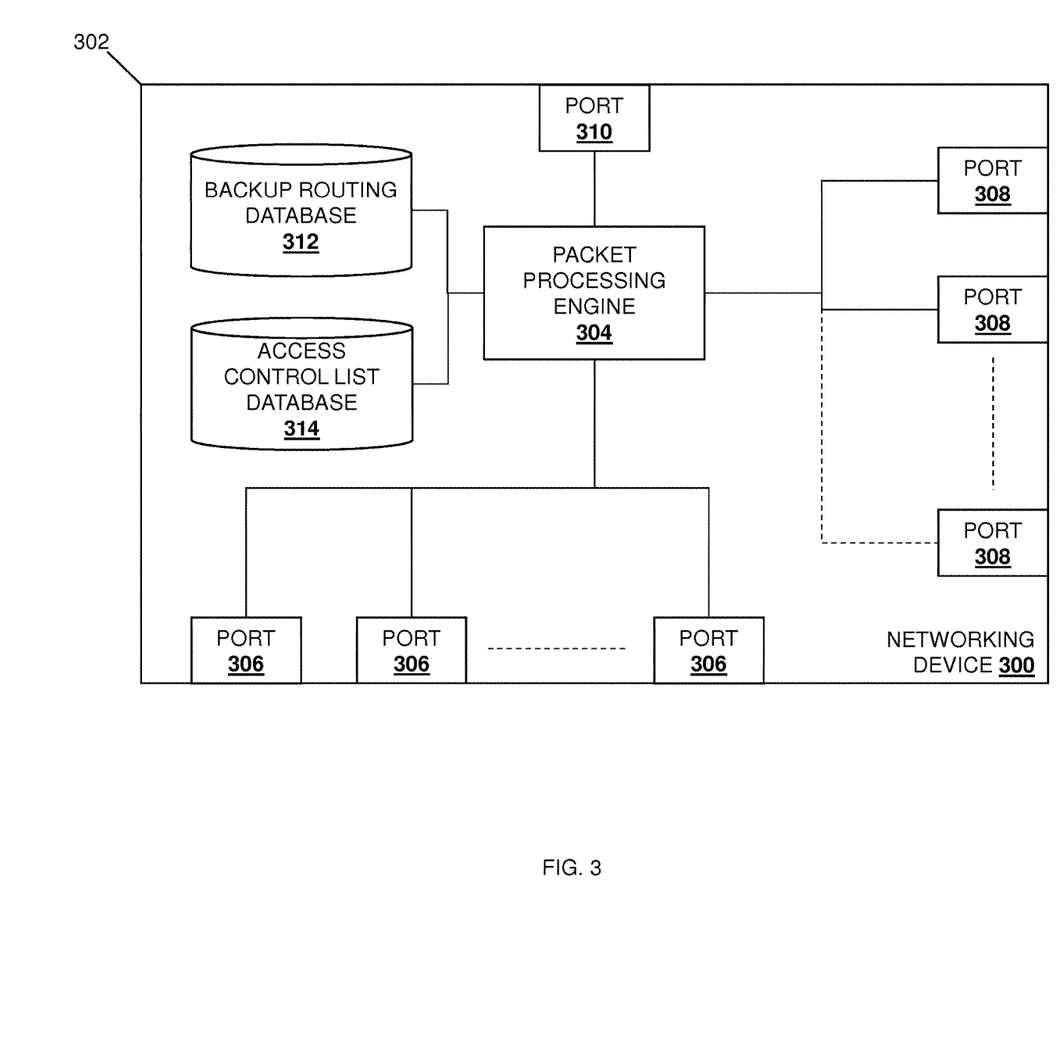
FIG. 3 is a schematic view illustrating an embodiment of a networking device in the layer 3 routing loop prevention system of FIG. 2.

Referring now to FIG. 3, an embodiment of a networking device 300 is illustrated. In an embodiment, the networking device 300 may be either or both of the networking devices 204a and/or 204b discussed above with reference to FIG. 2. As discussed above, in specific embodiments, the networking device 300 may be a control bridge device utilized with port extender devices in providing a logical switch, but in other embodiments may include a wide variety of networking devices known in the art. The networking device 300 includes a chassis 302 that may house the components of the networking device 300. In an embodiment, the networking device 300 includes a processing system (not illustrated, but which may include the processor 102 discussed above with reference to FIG. 1) that is housed in the chassis 302 and that is coupled to a memory system (not illustrated, but which may include the system memory 114 discussed above with reference to FIG. 1) that is housed in the chassis 302 and that includes instructions that, when executed by the processing system, cause the processing system to provide a packet processing engine 304 that is configured to perform the functions of the packet processing engines and networking devices discussed below. While the packet processing engine 304 is primarily described below as performing layer 3 routing loop prevention functions, one of skill in the art in possession of the present disclosure will recognize that the packet processing engine 304 may perform a variety of other networking device functions known in the art (e.g., packet receipt, packet routing, etc.) while remaining within the scope of the present disclosure.

In the illustrated embodiment, the packet processing engine 304 is coupled to a plurality of first ports 306 (e.g., via a coupling between the processing system and the ports 306). For example, with reference to FIG. 2, the first ports 306 may be provided on the networking device 204a and aggregated to provide the second LAG 212 to the extender device 206a, and/or may be provided on the networking device 204b and aggregated to provide the third LAG 214 to the extender device 206b. In the illustrated embodiment, the packet processing engine 304 is also coupled to a plurality of second ports 308 (e.g., via a coupling between the processing system and the ports 308). For example, with reference to FIG. 2, the second ports 308 may be provided on the networking device 204a and/or the networking device 204b and aggregated to provide the first LAG 210 between the networking devices 204a and 204b. In the illustrated embodiment, the packet processing engine 304 is also coupled to a port 310 (e.g., via a coupling between the processing system and the port 310). For example, with reference to FIG. 2, the third ports 310 may be provided on the networking device 204a and/or the networking device 204b and may provide one or more links coupled to the network 218.

The packet processing engine 304 is also coupled to one or more databases (e.g., via a coupling between the processing system and a storage device in the networking device 300) that stores information to enable the layer 3 routing loop prevention functions discussed below. In the illustrated embodiment, those databases include a backup routing database 312 and an access control list database 314. In the examples discussed below, the backup routing database 312 may be part of a routing database (not illustrated) and may include a backup "next-hop", routing path, or other instruction that provides one or more actions for the packet processing engine 304 to perform in response to determining that a link to a destination though an extender device is unavailable such that data cannot be sent over a primary data path (e.g., including in the routing database), as discussed in further detail below. In the examples discussed below, the access control list database 314 may include permissions, rules, or other instructions that provides one or more actions for the packet processing engine 304 to perform to determine whether and/or how to route a packet, as discussed in further detail below. While not illustrated, the networking device 300 may include a communication system (e.g., a Network Interface Controller (NIC)) or other subsystem that includes a networking device address such as, for example, a Media Access Control (MAC) address and/or other address associated with the networking device 300. While specific databases are illustrated and described as including specific information below, one of skill in the art in possession of the present disclosure will recognize that a variety of different databases and/or instructions other than those illustrated may be provided for the packet processing engine 304 in order to provide for the layer 3 routing loop prevention functions discussed below while remaining within the scope of the present disclosure.

Figure 4:
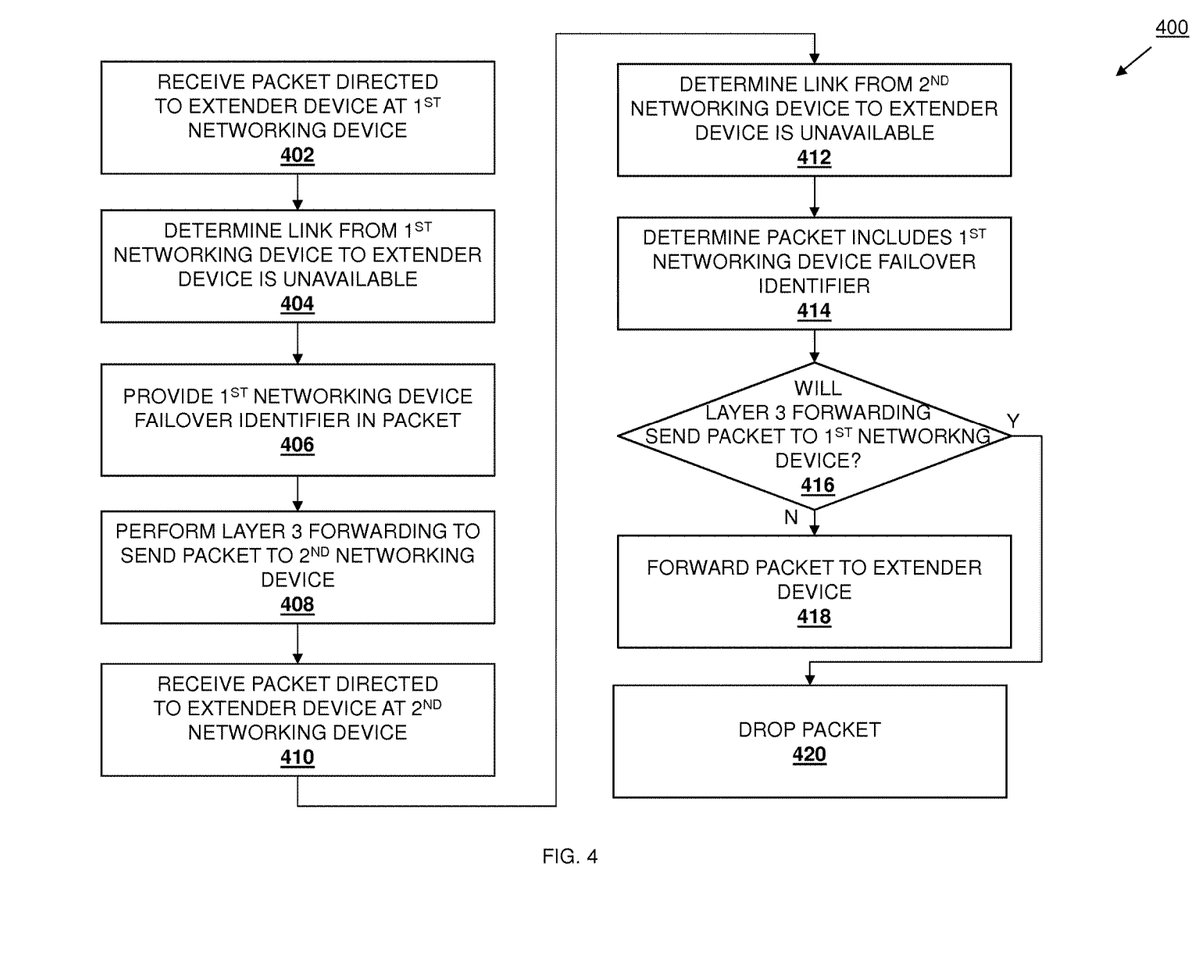
FIG. 4 is a flow chart illustrating an embodiment of a method for preventing layer 3 routing loops.

Referring now to FIG. 4, an embodiment of a method 400 for preventing layer 3 route looping is illustrated. In the embodiment illustrated and discussed below, the method 400 is utilized to prevent layer 3 routing loops between the networking/control bridge devices 204a and 204b when coupled to the extender/port extender device 208 through a fourth/VLT LAG 216 that is provided to a pair of extender/port extender devices 206a and 206b that are respectively directly connected to the networking devices 204a and 204b via second and third LAGs 212 and 214. In order to illustrate the some of the benefits of the layer 3 routing loop prevention system 200 described herein, conventional layer 3 routing failover mechanisms are described briefly below with regard to a simplified VLT system as well as the VLT system illustrated in FIG. 2.

First consider a simplified VLT system (not illustrated) that provides two networking/control bridge devices (e.g., the networking devices 204a and 204b) that are connected together by an Inter-Chassis Link (ICL)/LAG (e.g., the first LAG 210) and that are each connected to an extender/port extender device (e.g., the extender device 208) by a VLT LAG (e.g., the fourth LAG 216). Thus, the simplified VLT system is substantially similar to the system illustrated in FIG. 2, except with the removal of the extender devices 206a and 206b such that the networking devices 204a and 204b are directly connected to the extender device 208 by the links 216a and 216b, respectively, in the fourth LAG 216. In a conventional VLT failover scenario, if the link 216a between the networking device 204a the extender device 208 becomes unavailable, the networking device 204a may activate a failover mechanism and begin performing layer 3 routing of packets such that those packet are sent to the networking device 204b (e.g., by adding ports (e.g., the ports 308) in the ICL/LAG 210 as part of the VLT LAG 216). If the link 216b between the networking device 204b and the extender device 208 also becomes unavailable, the networking device 204b will also add ports (e.g., the ports 308) in the ICL/LAG 210 as part of the VLT LAG 216. However, the networking device 204b will begin performing layer 2 routing of the packets, and those packets will be source suppressed such that packets received from the networking device 204a will not be sent back over the ICL/LAG 210, thus preventing looping behavior.

Now consider a VLT system substantially similar to that illustrated in FIG. 2. In such a system, the conventional VLT failover scenario can cause issues because the extender device 208 is not directly connected to the networking devices 204a and 204b, but rather coupled to the networking devices 204a and 204b via "access" or intermediate extender devices 206a and 206b. As such, the conventional VLT failover mechanism discussed above can prevent data traffic from reaching host device(s) 220 and/or 222 that are coupled to the intermediate extender devices 206a and 206b, respectively. For example, if the link 216a between the extender device 206a and the extender device 208 becomes unavailable, the networking device 204a will begin performing the layer 3 routing of the packets such that those packet are sent to the networking device 204b as discussed above, and there will be no path available for routing packets to the host device(s) 220. Furthermore, if the links 216a and 216b between the both the extender devices 206a and 206b and the extender device 208 become unavailable, the networking device 204a will begin performing the layer 3 routing of the packets such that those packet are sent to the networking device 204b, and the networking device 204b will begin performing the layer 3 routing of the packets such that those packet are sent back to the networking device 204a, causing a layer 3 routing loop that will continue until the TTL of the packet goes to zero, during which the bandwidth of the ICL/LAG 210 will be occupied by that looping packet.

Furthermore, source suppression or other default blocking techniques on the ICL/LAG 210 to prevent the packet from being sent back over the ICL/LAG 210 to the networking device that forwarded it can also cause issues that discourage the use of such techniques. For example, if peer routing between the networking devices 204a and 204b is disabled, the networking devices 204a may perform layer 3 routing when the destination address in the packet (e.g., a Media Access Control (MAC) destination address) matches the address (e.g., a MAC address) of the networking device 204a, and may perform layer 2 routing when the destination address in the packet matches the address of the networking device 204b (and vice versa). In such a situation, the networking device 204a may provide the gateway through the logical switch 202 for a source host (not illustrated) that is coupled to the network 218, and layer 3 packets from that source host may reach either of networking device 204a or 204b due to, for example, LAG hashing behavior by a switch (not illustrated) in the network 218 that is coupled to the networking devices 204a and 204b by a LAG (not illustrated). If that source host sends a packet that is directed to one of the host device(s) 222 and that packet is received by the networking device 204b, that packet may then be layer 3 forwarded by the networking device 204b over the ICL/LAG 210 to the networking device 204a (i.e., because the networking device 204a is the gateway for the source host and the packet includes a destination address of the networking device 204a). The networking device 204a would then layer 3 forward the packet back to the networking device 204b over the ICL LAG 210 so that the networking device 204b may then forward that packet on to the host device 222 that is its destination. As such, source suppression or other blocking techniques would result in the networking device 204b dropping that packet in such scenarios.

Figure 5A:
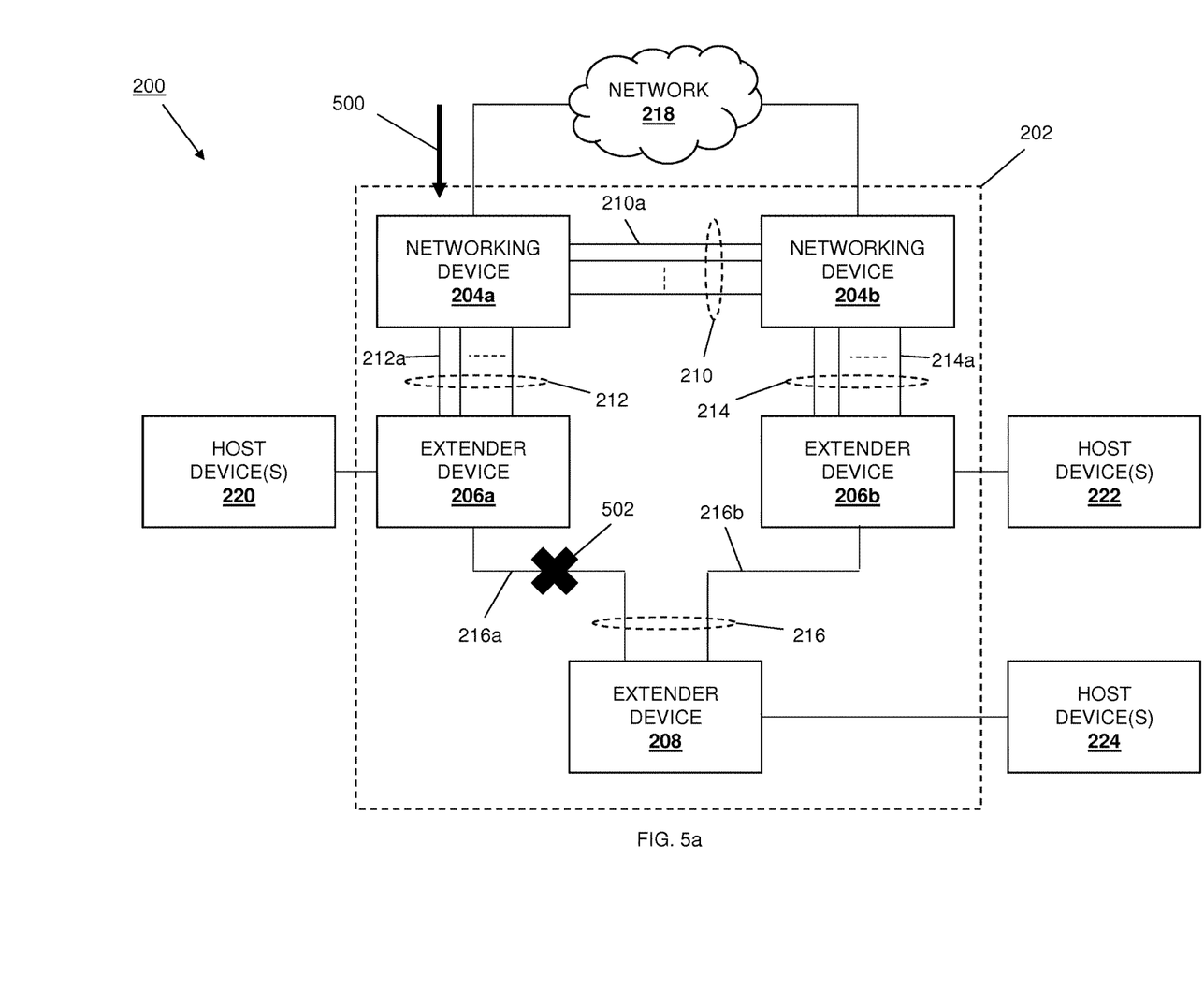
FIG. 5a is a schematic view illustrating an embodiment of the operation of the layer 3 routing loop prevention system of FIG. 2 operating according to the method of FIG. 4.

As discussed in further detail below, the method 400 may be utilized to avoid the issues discussed above, as well as other layer 3 routing loop issues, by providing for the determination by a networking device that its peer networking device has attempted to layer 3 route a packet and, if that has occurred, dropping that packet if the performance of layer 3 routing will result in that packet being forwarded back to the peer networking device. As such, the networking devices 204a and 204b of the layer 3 routing loop prevention system 200 are able to identify scenarios in which layer 3 routing loops can occur, and provide a mechanism to stop those loops. One of skill in the art in possession of the present disclosure will recognize that such functionality may coexist with the conventional layer 2 link failover mechanisms discussed above. The method 400 begins at block 402 where a packet that is directed to an extender device is received at a first networking device. Referring now to FIG. 5a, in an embodiment a packet is received (as indicated by the arrow 500 in FIG. 5a) from a source host (not illustrated) by the networking device 204a through the network 218. For example, at block 402 the packet processing engine 304 in the networking device 300/204a may receive the packet through the port 310 and determine that the packet is directed to the extender device 208 based on an L2 or L3 lookup in a table in the networking device 300/204a and/or utilizing other techniques known in the art.

The method 400 then proceeds to block 404 where it is determined that a link from the first networking device to the extender device is unavailable. In an embodiment, the packet processing engine 304 in the networking device 300/204a may determine that the link 216a between the extender device 206a and the extender device 208 is unavailable (e.g., as illustrated by element 502 in FIG. 5a). For example, the link 216a between the extender device 206a and the extender device 208 may be unavailable due to a link failure, and/or a variety of other issues known in the art. While only one of the link 216a in the fourth LAG 216 is illustrated as being unavailable, as discussed below, in some situations both of the links 216a and 216b in the fourth LAG 216 may fail or otherwise become unavailable at the same time (e.g., due to a LAG failure). The packet processing engine 304 in the networking device 300/204a may determine that its link 216a to the extender device 208 is unavailable in response to detecting that unavailability based on any of a variety of IEE 802.1br protocol factors known in the art. In an embodiment, in response to determining that its link 216a to the extender device 208 is unavailable, the packet processing engine 304 in the networking device 300/204a may enable a failover group for the extender device 208. For example, that failover group may include a backup next-hop, routing path, or other instruction in the backup routing database 312 of networking device 300/204a that causes the packet processing engine 304 to forward packets over the ICL/first LAG 210 to the networking device 204b, as well as perform the additional actions discussed below.

The method 400 then proceeds to block 406 where a first networking device failover identifier is provided in the packet. In some embodiments, the packet processing engine 304 in the networking device 300/204a may provide the first networking device failover identifier by providing an address of the networking device 300/204a (e.g., a MAC address) as the source of the packet. In addition, the packet processing engine 304 in the networking device 300/204a may provide the first networking device failover identifier by providing an address of the networking device 204b (e.g., a MAC address) as the destination of the packet. In specific embodiments, at block 406, the packet processing engine 304 in the networking device 300/204a does not modify the Virtual Local Area Network (VLAN) for the packet, and does not decrement the TTL for the packet. As discussed below, such actions at block 406 provide for layer 3 routing when the extender device 208 becomes unavailable while also providing an indication to the networking device 204b about the activation of the failover mechanism in the networking device 204a.

In some experimental embodiments, it has been found that the provision of the networking device addresses (e.g., the MAC addresses of the networking devices 204a and 204b) as the source and destination of the packet at block 406 as discussed above can cause some issues. For example, the ACL space for some conventional networking devices restrict how ACL entries are defined, and the provision of the networking device MAC addresses as the source and destination of the packet as discussed above can result in duplicate information being stored in the ACL space, thus providing for an inefficient use of that ACL space. With such systems, different embodiments of block 406 may be performed. In those embodiments, the packet processing engine 304 in the networking device 300/204a may provide the first networking device failover identifier by providing an address of the networking device 204b (e.g., a MAC address) as the destination of the packet, while providing an extension channel identifier (ECID) in the packet such as, for example, a reserved ECID. For example, the reserved ECID may be configured to assign the packet a virtual port, which as discussed below may be used to by the networking device 204b indication to determine that the failover mechanism in the networking device 204a has been activated. In specific embodiments, at block 406, the packet processing engine 304 in the networking device 300/204a does not modify the source address or the VLAN for the packet, and does not decrement the TTL for the packet. While a few examples of the first networking device failover identifier have been described, one of skill in the art in possession of the present disclosure will recognize that other identifiers, metadata, and/or information may be provided in or with the packet to identify that the failover mechanism of a networking device has been activated while remaining within the scope of the present disclosure.

Figure 5B:
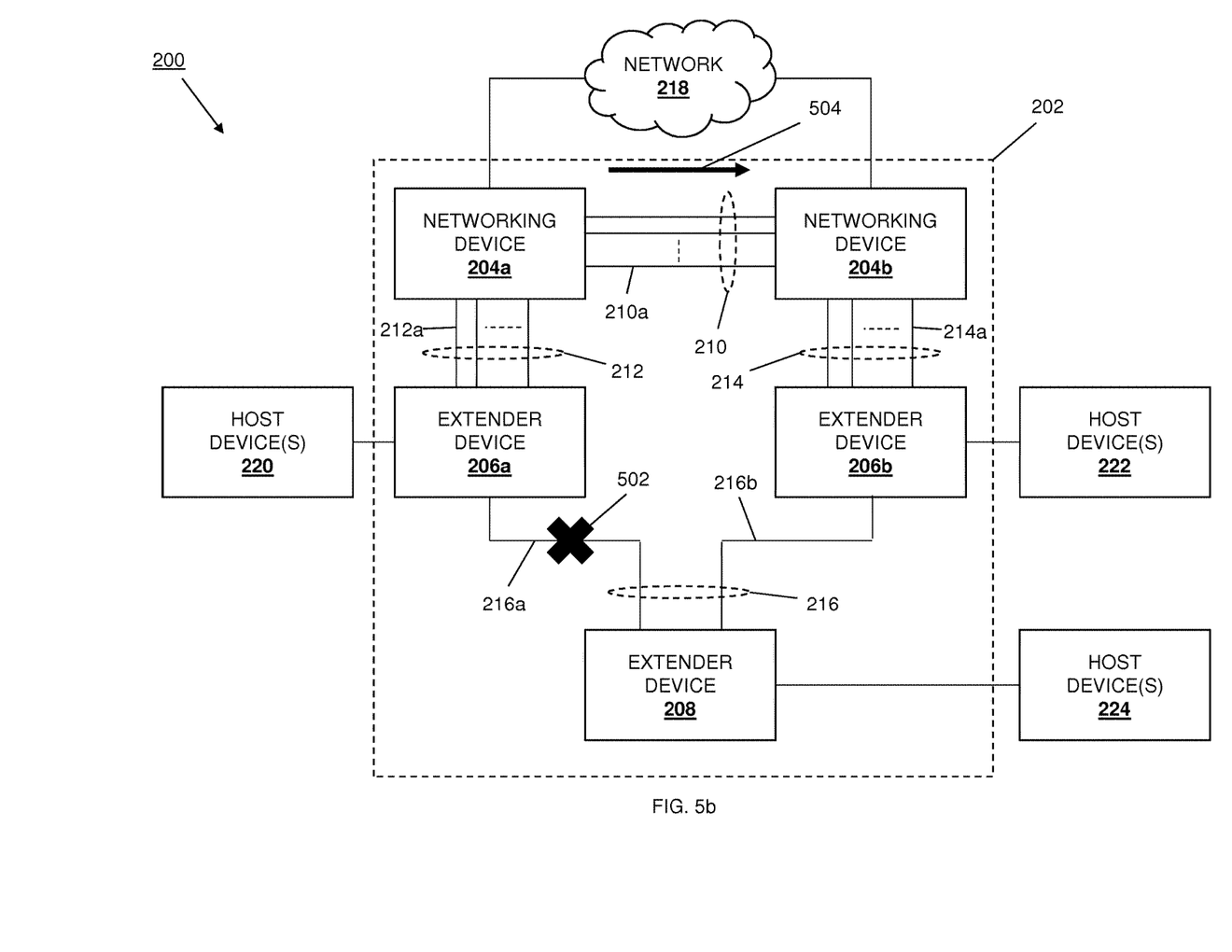
FIG. 5b is a schematic view illustrating an embodiment of the operation of the layer 3 routing loop prevention system of FIG. 2 operating according to the method of FIG. 4.

The method 400 then proceeds to block 408 where layer 3 forwarding is performed to send the packet to the second networking device. Referring now to FIG. 5b, in an embodiment, subsequent to performing the actions at block 406 discussed above, the packet processing engine 304 in the networking device 300/204a operates to perform layer 3 forwarding of the packet as per the backup next-hop/routing path in the backup routing database 312 such that the packet is sent through the port(s) 308 and over the link(s) 210a of the first LAG 210 to the networking device 204b (as illustrated by the arrow 504). The details of layer 3 forwarding of packets are known in the art and not described in detail herein. The method 400 then proceeds to block 410 where the packet directed to the extender device is received at the second networking device. In an embodiment, the packet processing engine 304 in the networking device 300/204b receives the packet that is directed to the extender device 208 through its port(s) 308.

Figure 5C:
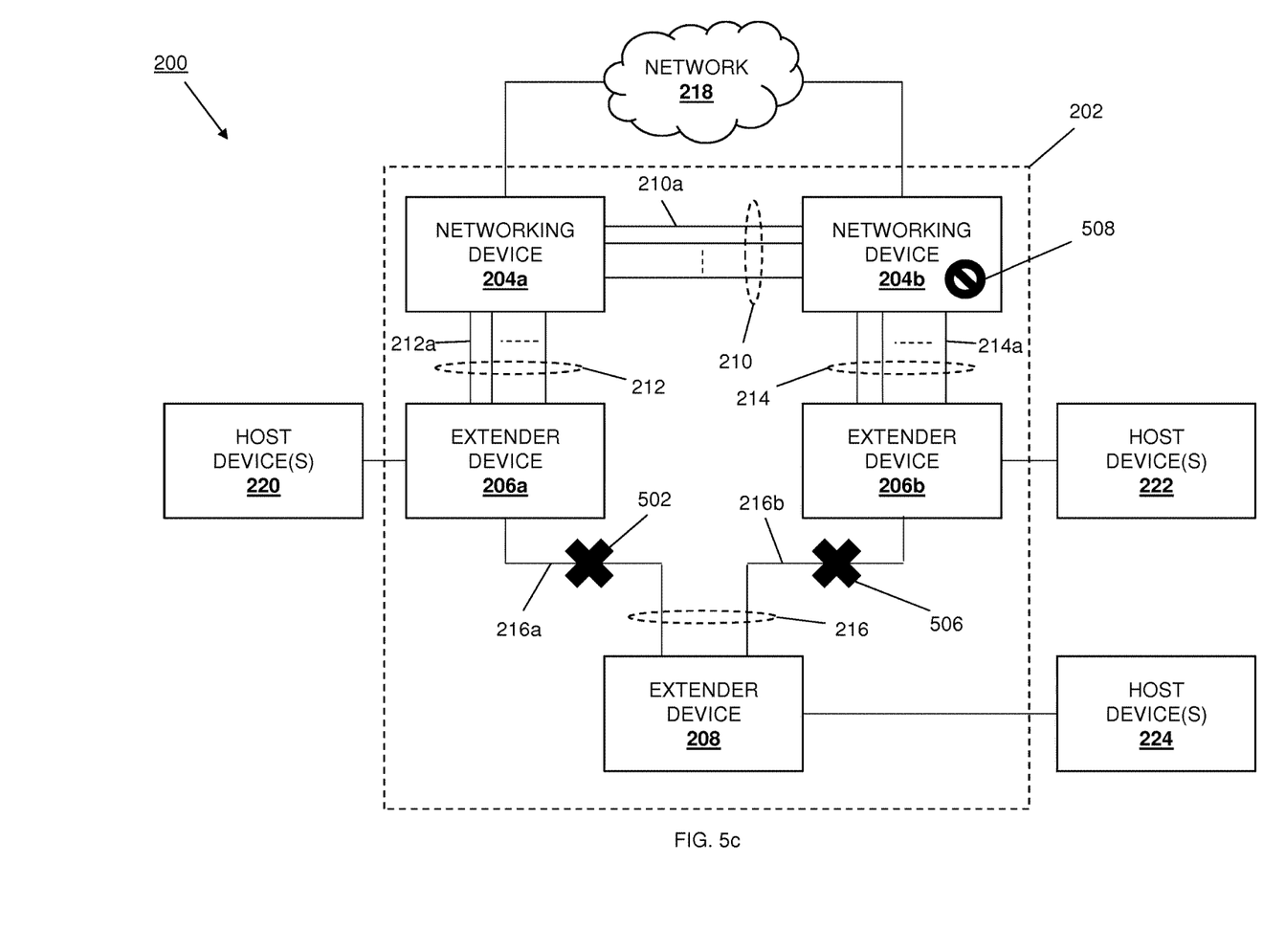
FIG. 5c is a schematic view illustrating an embodiment of the operation of the layer 3 routing loop prevention system of FIG. 2 operating according to the method of FIG. 4.
Figure 5D:
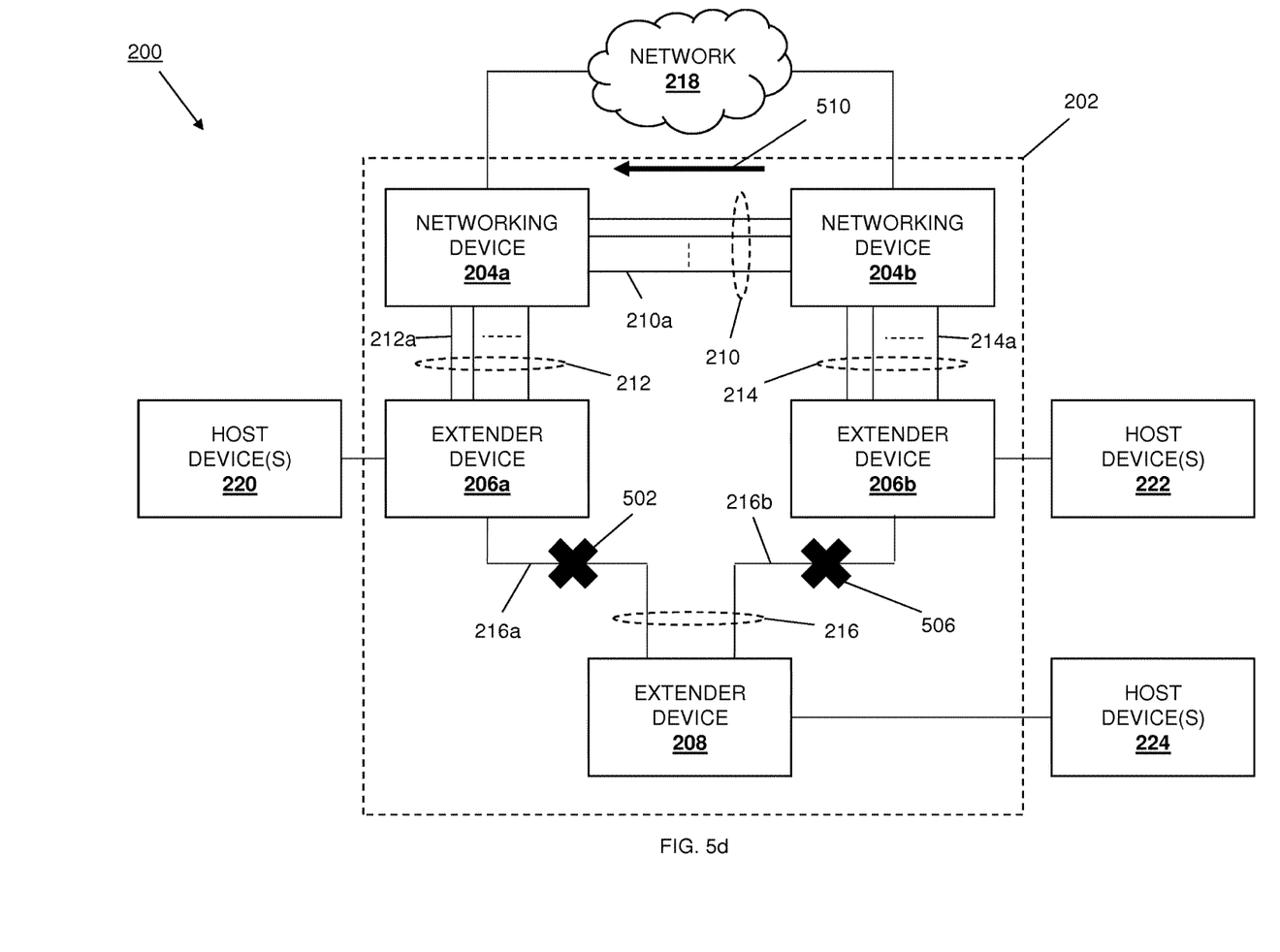
FIG. 5d is a schematic view illustrating an embodiment of the operation of the layer 3 routing loop prevention system of FIG. 2 operating according to the method of FIG. 4.
Figure 5E:
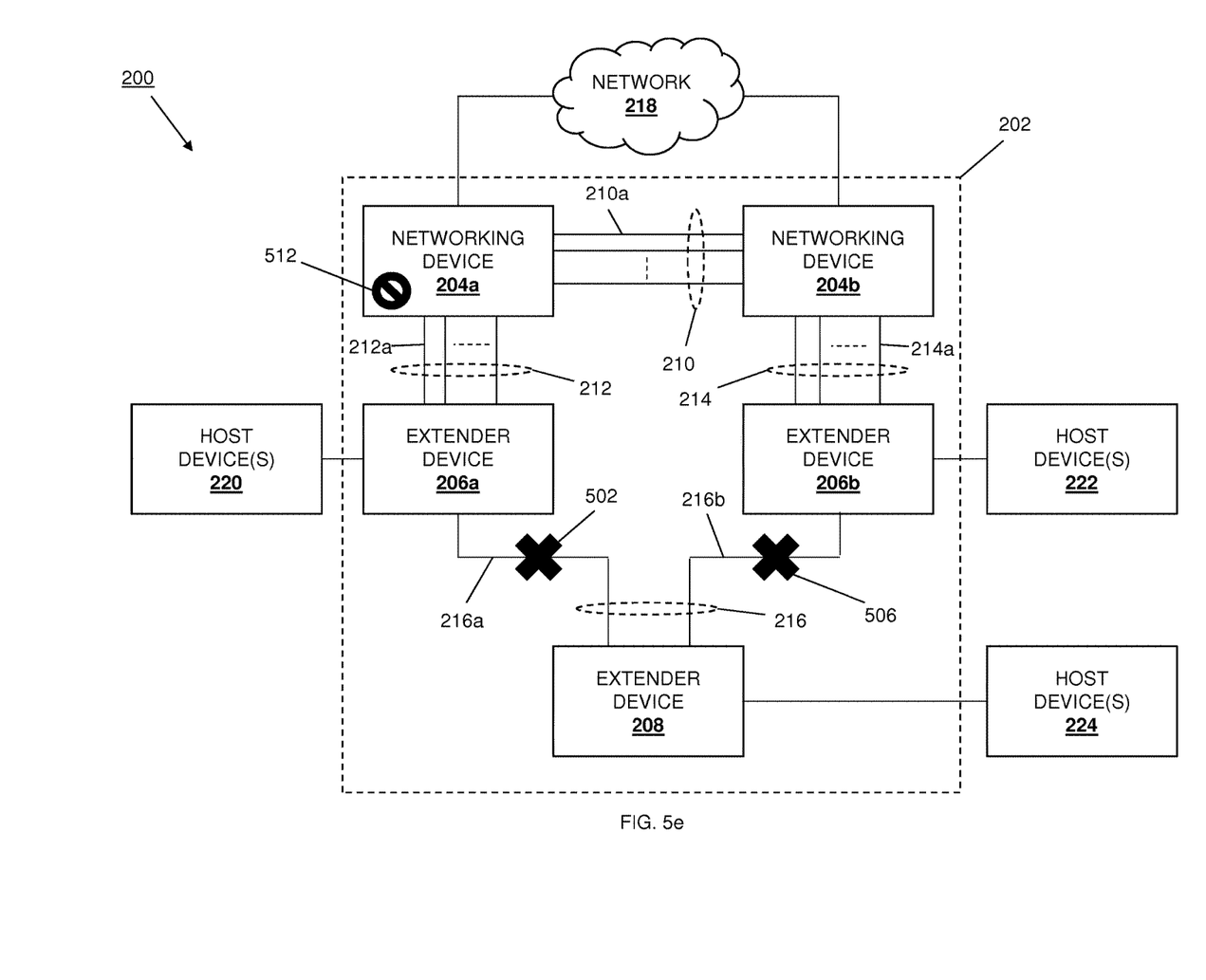
FIG. 5e is a schematic view illustrating an embodiment of the operation of the layer 3 routing loop prevention system of FIG. 2 operating according to the method of FIG. 4

The method 400 then proceeds to block 412 where it is determined that a link from the second networking device to the extender device is unavailable. Referring now to FIG. 5c, in an embodiment, the packet processing engine 304 in the networking device 300/204b may determine that the link 216b between the extender device 206b and the extender device 208 is unavailable (e.g., as illustrated by the element 506 in FIG. 5c). For example, the link 216b between the extender device 206b and the extender device 208 may be unavailable due to a link failure, and/or a variety of other issues known in the art. The packet processing engine 304 in the networking device 300/204b may determine that its link 216b to the extender device 208 is unavailable in response to detecting that unavailability based on any of a variety of IEE 802.1br protocol factors known in the art.

The method 400 then proceeds to block 414 where it is determined that the packet includes the first networking device failover identifier. In some embodiments, the packet processing engine 304 in the networking device 300/204b may determine that the packet includes the first networking failover identifier when the packet is received over the ICL/first LAG 210, the source of the packet includes the address of the networking device 204a (e.g., its MAC address), and the destination of the packet includes the address of the networking device 204b (e.g., its MAC address). For example, the determinations at block 414 may be made using an ACL entry in the ACL database 314 having match criteria that includes an incoming port that is part of the ICL/first LAG 210, an incoming packet source address that is the MAC address of the first networking device 204a, and a destination address of the packet that is the MAC address of the networking device 204b. In other embodiments, the packet processing engine 304 in the networking device 300/204b may determine that the packet includes the first networking failover identifier when the packet is received over the ICL/first LAG 210 and the packet includes the reserved ECID (or is assigned a virtual port via a reserved ECID as discussed above). For example, the determinations at block 414 may be made using an ACL entry in the ACL database 314 having match criteria that includes an ingress interface that is part of the ICL/first LAG 210 and the reserved ECID/assigned virtual port. While a few examples have been provided, one of skill in the art in possession of the present disclosure will recognize how other failover identifiers may be determined to be included in the packet using other information and/or combinations of information while remaining within the scope of the present disclosure. If the packet does not include the first networking device failover identifier, then the packet may be forwarded based on a layer 3 forwarding decision such that the packet can be routed back on the ICL/first LAG 210.

The method 400 then proceeds to decision block 416 where it is determined whether layer 3 forwarding will send the packet to the first networking device. In embodiments where the link 216b is available and/or there are other paths to the extender device 208 that do not go through the networking device 204a (neither of which is illustrated), the packet processing engine 304 may determine at decision block 416 that layer 3 forwarding will not result in the packet being sent to the networking device 204a. In response, the method 400 will proceed to block 418 where the packet is forwarded to the extender device. In an embodiment, the packet processing engine 304 in the networking device 300/204b will then perform layer 3 forwarding of the packet to send the packet to the extender device 208 through the available path that does not include the networking device 204a. As such, when the link 216a is unavailable but the networking device 204b has available links or paths to the extender device 208, the packet is forwarded to the extender device 208.

In an embodiment, in response to determining that its link 216b to the extender device 208 was unavailable at block 412, the packet processing engine 304 in the networking device 300/204b may have enabled a failover group for the extender device 208 that includes a backup next-hop, routing path, or other instruction in the backup routing database 312 of the networking device 204b that would cause the packet processing engine 304 to forward packets over the ICL/first LAG 210 to the networking device 204a. At decision block 416, with the failover group enabled, the packet processing engine 304 in the networking device 300/204b may access the backup routing database 312 and determine that when the link 216b to the extender device 208 is unavailable, the backup next hop, path, or other instruction provides for the layer 3 forwarding of the packet back over the ICL/first LAG 210 to the networking device 204a.

In response to determining that layer 3 forwarding of the packet will result in the packet being forwarded back over the ICL/first LAG 210 to the networking device 204a at decision block 416, the method 400 will proceed to block 420 where the packet is dropped. Referring now to FIG. 5c, in an embodiment, the packet processing engine 304 in the networking device 204b drops the packet (as indicated by element 508). For example, the determination at decision block 416 may be made using an ACL entry in the ACL database 314 having match criteria that includes an egress port that is part of the ICL/first LAG 210 and that is determined by a layer 3 routing action. As such, the ACL database may include an ACL entry having match criteria that includes an incoming port that is part of the ICL/first LAG 210, an incoming packet source address that is the MAC address of the first networking device 204a, a destination address of the packet that is the MAC address of the networking device 204b, and a layer 3 routing egress port that is part of the ICL/first LAG 210, and when a packet and/or actions associated with that packet match those match criteria, the packet processing engine 304 will drop that packet.

In another example, the determinations at decision block 416 may be made using an ACL entry in the ACL database 314 having match criteria that includes a next hop that will send the packet back to the device from which it was received and that is determined by a layer 3 routing action. As such, the ACL database may include an ACL entry having match criteria that includes an ingress interface that is part of the ICL/first LAG 210, that the packet includes the reserved ECID/assigned virtual port, and a layer 3 routing next hop that will return the packet to the device from which it was received, and when a packet and/or actions associated with that packet match those match criteria, the packet processing engine 304 will drop that packet.

The embodiment illustrated in FIGS. 5a, 5b, and 5c and discussed above provides an example of a system in which peer routing is enabled between the networking devices 204a and 204b. In such an example, the packet may be received at the networking device 204a with a destination address that is the MAC address of the networking device 204a. The networking device 204a may determine that the link 216a is unavailable such that its failover mechanism activates and the packet is sent over the first LAG 210 with the destination address changed to the MAC address of the networking device 204b and the reserved ECID added. The networking device 204b may then receive the packet, determine that the link 216b is unavailable, and that the packet has been assigned a virtual port due to the reserved ECID. With the link unavailable, the failover mechanism for the networking device 204b will activate such that the packet will be associated with an instruction to send it back over the first LAG 210 to the networking device 204a. However, that packet will match the ACL entry due to that packet being received over the first LAG 210, having been assigned the virtual port, and being subject to layer 3 routing that will result in it being sent back to the networking device 204a, and as a result that packet will be dropped.

FIGS. 5a, 5b, 5d, and 5e provide an example of a system in which peer routing is disabled between the networking devices 204a and 204b. In such an example, the packet may be received at the networking device 204a with a destination address that is the MAC address of the networking device 204b. The networking device 204a may then switch the packet over the first LAG 210 without adding the reserved ECID to that packet because, as discussed above, the destination address of the packet is not the MAC address of the networking device 204a. The networking device 204b receives the packet and determines that the link 216b is unavailable such that its failover mechanism activates and the packet is sent back over the first LAG 210 (as indicated by the arrow 510) with the destination address changed to the MAC address of the networking device 204a and the reserved ECID added. The networking device 204a may then receive the packet, determine that the link 216a is unavailable, and that the packet has been assigned a virtual port due to the reserved ECID. With the link unavailable, the failover mechanism for the networking device 204a will activate such that the packet will be associated with an instruction to send it back over the first LAG 210 to the networking device 204b. However, that packet will match the ACL entry due to that packet being received over the first LAG 210, having been assigned the virtual port, and being subject to layer 3 routing that will result in it being sent back to the networking device 204b, and as a result that packet will be dropped (as indicated by element 512).

Thus, systems and methods have been described that prevent layer 3 routing loops. In a specific example, the systems and methods allow a control bridge device to indirectly indicate to a peer control bridge device that layer 3 routing was attempted to send a packet to a port extender device that was unreachable over a link between the control bridge device and the port extender device. Such indirect indications can be enabled by modifying packet fields in the packet such as the source MAC address and/or adding a reserved ECID before sending that packet over an ICL to the peer control bridge device. The peer control bridge device can detect the source MAC address and/or reserved ECID that indicate that layer 3 routing was attempted by the control bridge device, and if the packet is to be routed back over the ICL to the control bridge device, the peer control bridge device will then drop that packet to prevent the layer 3 routing loop. Such mechanisms scale well as the layer 3 backup next-hop is common for all the next hops destined for a port extender device port, and may be enabled by a single ACL entry. In addition, this failover mechanism integrates easily with layer 2 failover mechanisms.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A layer 3 routing loop prevention system, comprising:
an extender device;
a first control bridge device that is coupled to the extender device by at least one first link in a first link aggregation group (LAG); and
a second control bridge device that is coupled to the extender device by at least one second link in the first LAG, to the first control bridge device by at least one third link, and to a network, wherein the second control bridge device is configured to:
 receive a packet through the network that is directed to the extender device;
 determine that the at least one second link is unavailable for forwarding the packet to the extender device;

provide a second control bridge device failover identifier in the packet, wherein the second control bridge device failover identifier is configured to provide an indication to the first control bridge device that a failover mechanism in the second control bridge device has been activated; and perform layer 3 forwarding to send the packet to the first control bridge device over the at least one third link;

wherein the first control bridge device is configured to:
receive the packet from the second control bridge device over the at least one third link;
determine that the at least one first link is unavailable for forwarding the packet to the extender device;
determine that the performance of layer 3 forwarding will result in the packet being sent to the second control bridge device; and
drop the packet in response to determining that the packet was received from the second control bridge device over the at least one third link, includes the second control bridge device failover identifier that indicates that the failover mechanism in the second control bridge device has been activated, and will be sent to the second control bridge device if layer 3 forwarding is performed.

2. The layer 3 routing loop prevention system of claim 1, wherein the providing the second control bridge device failover identifier in the packet includes providing a second control bridge device address of the second control bridge device as a source of the packet.

3. The layer 3 routing loop prevention system of claim 1, wherein the providing the second control bridge device failover identifier in the packet includes providing an extension channel identifier in the packet.

4. The layer 3 routing loop prevention system of claim 3, wherein the extension channel identifier assigns a virtual port to the packet, and wherein the first control bridge device determines the packet includes the second control bridge device failover identifier by determining that the packet has been assigned the virtual port.

5. The layer 3 routing loop prevention system of claim 1, wherein the second control bridge device is configured to:
provide a first control bridge address as a destination of the packet, wherein the first control bridge device is configured to:
drop the packet in response to determining that the packet was received from the second control bridge device over the at least one third link, includes the second control bridge device failover identifier that indicates that the failover mechanism in the second control bridge device has been activated; will be sent to the second control bridge device if layer 3 forwarding is performed, and includes the first control bridge address as the destination.

6. The layer 3 routing loop prevention system of claim 1, wherein the at least one third link is part of a second LAG between the first control bridge device and the second control bridge device.

7. An information handling system (IHS) comprising:
at least one first port that is coupled to at least one first link in a first link aggregation group (LAG) provided on an extender device;
a second port that provides a second link to a control bridge device;
a processing system that is coupled to the at least one first port and the second port; and
a memory system that includes instructions that, when executed by the processing system, cause the processing system to provide a packet processing engine that is configured to:
receive a first packet through the second link from the control bridge device, wherein the first packet is directed to the extender device;
determine that the at least one first link is unavailable for forwarding the first packet to the extender device;
determine that the first packet includes a control bridge device failover identifier that indicates that the failover mechanism in the control bridge device has been activated;
determine that the performance of layer 3 forwarding will result in the first packet being sent to the control bridge device; and
drop the first packet in response to determining that the first packet was received through the second link, includes the control bridge device failover identifier that indicates that the failover mechanism in the control bridge device has been activated, and will be sent to the control bridge device if layer 3 forwarding is performed.

8. The IHS of claim 7, wherein the control bridge device failover identifier includes a control bridge device address of the control bridge device as a source of the first packet, and wherein the packet processing engine is configured to determine that the first packet includes the control bridge device failover identifier in response to the source of the first packet including the control bridge device address.

9. The IHS of claim 7, wherein the control bridge device failover identifier includes an extension channel identifier in the first packet, and wherein the packet processing engine is configured to determine that the first packet includes the control bridge device failover identifier in response to detecting the extension channel identifier.

10. The IHS of claim 9, wherein the extension channel identifier assigns a virtual port to the first packet, and wherein the packet processing engine detects the extension channel identifier by determining that the first packet has been assigned the virtual port.

11. The IHS of claim 7, wherein the processing system is coupled to a subsystem that includes an IHS address, and wherein the packet processing engine is configured to:
determine that the first packet includes the IHS address as a destination; and
drop the first packet in response to determining that the first packet was received through the second link, includes the control bridge device failover identifier that indicates that the failover mechanism in the control bridge device has been activated, will be sent to the control bridge device if layer 3 forwarding is performed, and includes the IHS address as the destination.

12. The IHS of claim 7, wherein the second link is part of a second LAG for communicating with the control bridge device.

13. The IHS of claim 7, further comprising:
a third port that is coupled to the processing system and provides a fourth link to a network, wherein packet processing engine is configured to:
receive a second packet through the fourth link, wherein the second packet is directed to the extender device;
determine that the at least one first link is unavailable for forwarding the second packet to the extender device;

provide a IHS failover identifier in the second packet that is configured to indicate to the control bridge device that a failover mechanism in the IHS has been activated; and
perform layer 3 forwarding to send the second packet to the control bridge device over the second link.

14. A method for preventing layer 3 routing loops, comprising:
receiving, by a first control bridge device through a first link from a second control bridge device, a first packet that is directed to an extender device;
determining, by the first control bridge device, that at least one second link of a first link aggregation group (LAG) is unavailable for forwarding the first packet to the extender device;
determining, by the first control bridge device, that the first packet includes a second control bridge device failover identifier that indicates that a failover mechanism in the second control bridge device has been activated;
determining, by the first control bridge device, that the performance of layer 3 forwarding will result in the first packet being sent to the second control bridge device; and
dropping, by the first control bridge device, the first packet in response to determining that the first packet was received through the first link, includes the second control bridge device failover identifier that indicates that the failover mechanism in the second control bridge device has been activated, and will be sent to the first control bridge device if layer 3 forwarding is performed.

15. The method of claim 14, wherein the second control bridge device failover identifier includes a second control bridge device address of the second control bridge device as a source of the first packet, and wherein the determining that the first packet includes the second control bridge device failover identifier includes determining that the source of the first packet includes the second control bridge device address.

16. The method of claim 14, wherein the second control bridge device failover identifier includes an extension channel identifier in the first packet, and wherein the determining that the first packet includes the second control bridge device failover identifier includes detecting the extension channel identifier.

17. The method of claim 16, wherein the extension channel identifier assigns a virtual port to the first packet, and wherein the detecting the extension channel identifier includes determining that the first packet has been assigned the virtual port.

18. The method of claim 14, further comprising:
determining, by the first control bridge device, that the first packet includes a first control bridge device address of the first control bridge device as a destination; and
dropping, by the first control bridge device, the first packet in response to determining that the first packet was received through the first link, includes the second control bridge device failover identifier that indicates that a failover mechanism in the second control bridge device has been activated, will be sent to the first control bridge device if layer 3 forwarding is performed, and includes the first control bridge device address as the destination.

19. The method of claim 14, wherein the first link that is part of a second LAG between the first control bridge device and the second control bridge device.

20. The method of claim 14, further comprising:
receiving, by the first control bridge device through a forth link that is coupled to network, a second packet that is directed to the extender device;
determining, by the first control bridge device, that the at least one second link is unavailable for forwarding the second packet to the extender device;
providing, by the first control bridge device, a first control bridge device failover identifier in the second packet, wherein the first control bridge device failover indicator is configured to indicate to the second control bridge device that a failover mechanism in the first control bridge device has been activated; and
performing, by the first control bridge device, layer 3 forwarding to send the second packet to the second control bridge device over the first link.

* * * * *